Patented Apr. 24, 1923.

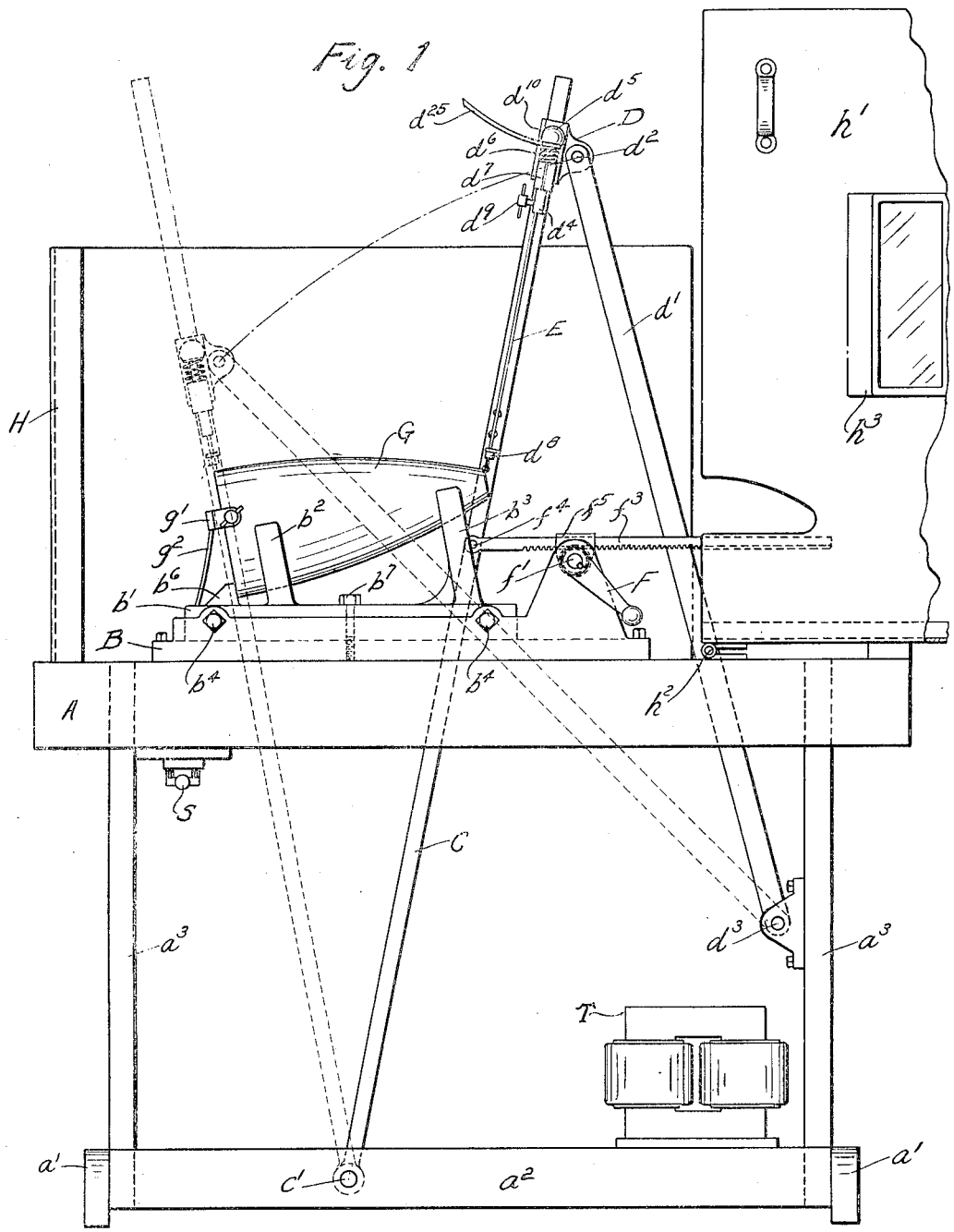

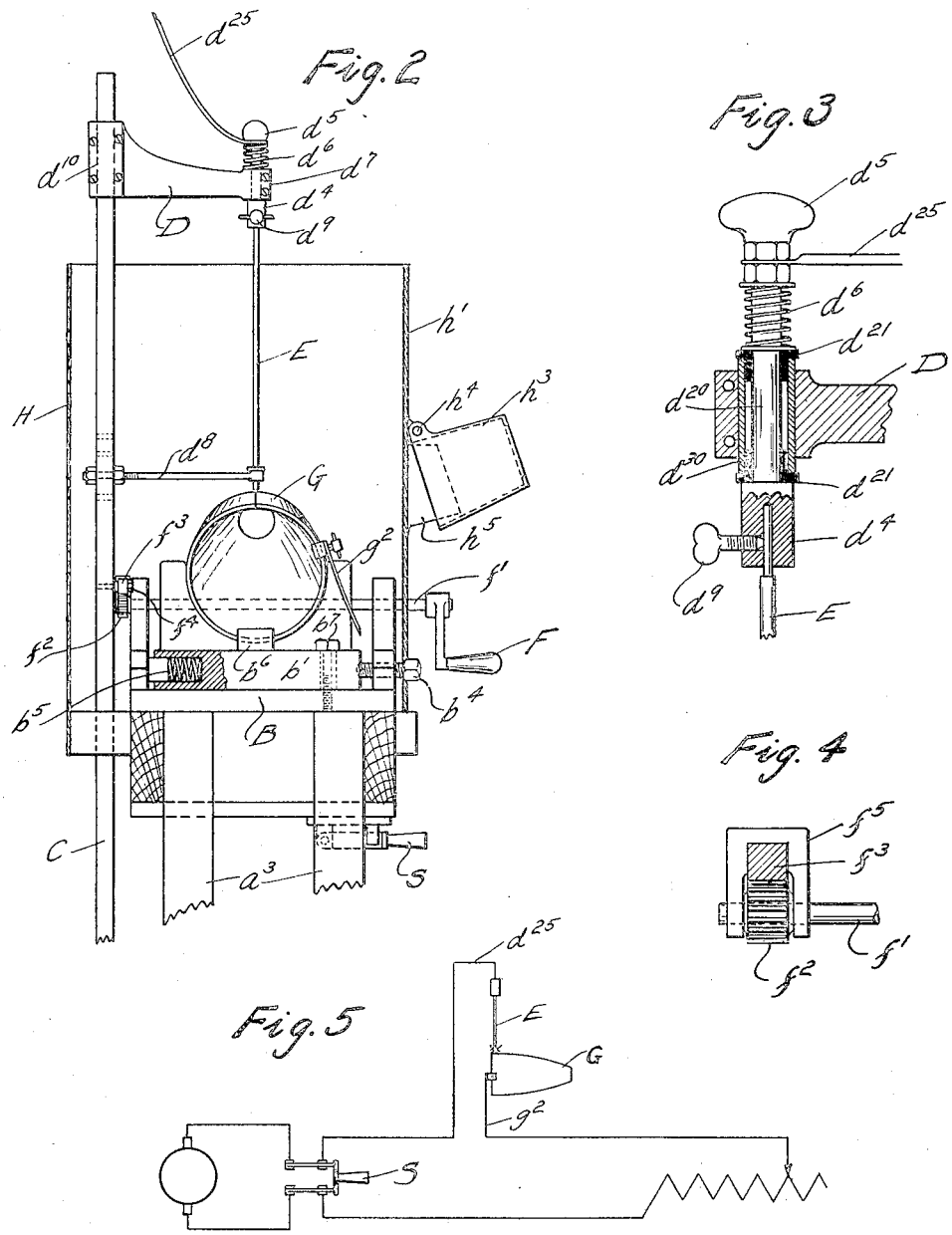

1,453,025

UNITED STATES PATENT OFFICE.

REUBEN STANLEY SMITH, OF MILWAUKEE, WISCONSIN, ASSIGNOR TO A. O. SMITH CORPORATION, OF MILWAUKEE, WISCONSIN, A CORPORATION OF NEW YORK.

APPARATUS FOR ELECTRIC-ARC WELDING.

Application filed December 6, 1918. Serial No. 265,522.

*To all whom it may concern:*

Be it known that I, REUBEN STANLEY SMITH, a citizen of the United States, residing in the city of Milwaukee, in the county of Milwaukee and State of Wisconsin, have invented a certain new and useful Improvement in Apparatus for Electric-Arc Welding, and do hereby declare that the following is a full, clear, and exact description thereof, such as will enable persons skilled in the art to which the invention pertains to make, use, and practice the same, reference being had to the drawings hereto attached for disclosure as to certain details of construction and arrangement.

The present invention relates to that branch of arc-welding in which the work is incorporated in the electrical circuit, and in which a fusible electrode is also employed, such electrode being consumed by the heat created by the electric current and the molten metal of the electrode being deposited at the union of the metal surfaces which are to be welded, during the travel of the electrode along the welding line.

The old practice of feeding fusible electrodes by hand is objectionable, in that it is impossible for the operator to feed the electrode regularly and maintain a constant arc. As a result, unsatisfactory and defective work is produced, at times, even by skilled workmen; moreover, the metal is not deposited uniformly by reason of the irregular feed and varying arc.

It is the purpose of my invention to eliminate the objections mentioned as residing in the former practice, by the provision of means or devices for automatically feeding the electrodes at a predetermined rate of speed, whereby a substantially constant arc is maintained at all times between the electrode and the parts to be welded, with the result that the said parts are uniformly heated and the molten metal of the electrode is deposited evenly at the union of the surfaces to be welded, and throughout the line of the weld, so that a joint uniform throughout as to structure and maximum as to strength, is produced.

By my process of welding, a definite length of the electrode is fused and united with a corresponding length or section of the work to be welded; that is to say, an electrode of any practicable length, will be so fed that the consumption of the electrode will correspond exactly with the rate of traverse of the electrode along the welding line of the work. This method of feeding the electrode enables me to produce a joint in which the fused metal of the electrode flows and is deposited in an even layer, and to continue the work without interruption from start to finish. A substantially constant arc must be maintained in order to secure an even flow of metal in the fusion of the electrode.

In my present invention, the surfaces to be welded are arranged in position, and the electrode, supported by mechanical devices, is moved along the line forming the juncture of the edges to be welded. Compensating devices are provided for giving a uniform feed to the electrode, so that as the latter is consumed, the remaining portion thereof is automatically advanced toward the work, and as indicated, a substantially constant arc is maintained throughout the operation.

The best results are obtained by the use of an electrode of iron or steel wire of a quality corresponding to the character of the metal in the work. Such electrode may be covered with a suitable coating of material which will form a crater, and be provided also with any of the well known materials possessing affinity for and which will combine freely with the oxygen liberated by the heat, so that oxidization of the metal at the welding line will not occur, and a perfectly welded joint be secured without any tendency to deterioration in the metals.

The rapidity with which the welding operation is performed by my invention is productive of a very great economy in the consumption of electrical current, for the reason that the heating of the surfaces to be welded is centralized momentarily within a very limited area extending parallel to the welding line, this result being due to the fact that the electrode has an accelerated but uniform traverse motion along such welding line while the current is flowing from the electrode to the work. There is consequently no disturbance of the molecular structure of the materials outside of the said limited area.

The free end of the electrode will be arranged in normal position so as to leave a gap between it and the point at which the welding operation is to commence. To close the gap and thus strike the arc, I have mounted the electrode so as to have an initial movement in the direction of its length, with provisions for immediate retraction to normal position. The electrode is supported by a carrier which is held in retracted position by the force of an expansion spring. By compressing the spring the gap is closed for an instant and the arc is established. With the retraction of the carrier, the arc will continue to flow while the electrode is being actuated to traverse the welding line. The electrode carrier has provision for an independent, longitudinal adjustment, so that with electrodes of stated length, the gap between the point of the electrode and the work will not vary.

By the use of my process and apparatus, the operation of welding is performed with greater facility and dispatch, and the production by the workman or operator is increased many times over the highest achievement possible by the use of the old method of manually feeding the electrode.

In order to avoid injury to the eyes of the operator by the powerful light produced by the electric arc, I have provided a housing or shield for enclosing the welding elements, and have also provided a colored glass screen, which is vertically adjustable, in an opening in the front wall of the housing or shield, through which the operator may observe the progress of the welding operation, without harmful or injurious effect upon his sight. The housing or shield acts also to prevent inhalation by the operator of the gases generated in the operation of welding.

The said front wall of the housing or shield is hinged so as to be turned to one side, to enable the operator to position the parts to be welded and to remove such parts after the welding operation has been completed; and also to effect replenishment of the electrodes and make other adjustments when necessary.

The welding apparatus herein disclosed has been embodied in a large number of machines, which are now operating in the manufacture of aerial bombs for the use of the American Expeditionary Forces in the present war with Germany. In the drawings attached hereto I have shown the machine as operating to produce a seam-weld upon the head section of the tubular shell of such a bomb. My invention, however, is not limited to the use specified, but may be used in any relation or in connection with any work to which it may be applicable. Nor is it intended to limit its application to welding in the manufacture of tubular articles, inasmuch as the process of welding and the electrode feeding devices embodying my invention may be employed with equal facility and success in depositing metal upon the surfaces of solid bodies, whenever it may be found necessary or desirable to reinforce or increase such surfaces by the union of additional material therewith.

While I have shown the work as held in a stationary position in the apparatus, and the electrode as moving thereover, it is obvious that it will be within the scope of my invention to hold the electrode in a relatively stationary position, and to give a traverse motion to the work during the welding operation. Such an apparatus forms the subject-matter of my application of even date, Serial No. 265,523.

In the drawings hereto attached I have illustrated one simple form of apparatus designed to permit the practice of my process of welding, but the apparatus illustrated may be modified, and other forms of apparatus, which will enable the electrode to be fed automatically and progressively, and so produce an even and uniform flow of fused metal at the welding line, may be used without departing from the spirit of my invention.

The features constituting my invention are recited in the claims appended to this specification.

In the drawings:—

Fig. 1, shows an elevation an apparatus embodying my invention and in a form which will enable my process of welding to be carried on, the point of the electrode being moved along the welding line, and the front wall of the housing or shield being turned to the side.

Fig. 2, is a vertical partly sectional view, from the left of Fig. 1, but showing the shield in the position which it occupies during the operation of the apparatus.

Fig. 3, shows in detail the construction of the electrode carrier.

Fig. 4, the means employed for holding the rack and pinion in engagement.

Fig. 5, is a diagram of the electrical wiring of the apparatus.

Referring to the accompanying drawings, a table A is supported by feet $a^1$, base $a^2$, and standards $a^3$. Upon the table A is mounted a stand B, upon which rests a plate $b^1$, provided with pillow-blocks $b^2$ and $b^3$, for holding the shell G, the longitudinal seam of which is to be welded. The pillow-blocks $b^2$ and $b^3$, are recessed in their upper sides, as indicated in the drawings, such recesses conforming to the cross-sectional contour of the shell G, at the points where it rests upon the pillow-blocks, the said shell remaining in a position of rest when laid in the recesses of the pillow-blocks, by virtue of its own weight. A stop $b^6$, secured to the plate $b^1$, acts as a longitudinal positioning device for the shell G, and prevents it from displacement in that direction during the welding operation.

For the purpose of accurately positioning the shell so that the seam to be welded will be exactly in the path of traverse of the electrode during the welding operation, I have provided means for the lateral adjustment of the plate $b^1$, upon the stand B. Adjusting screws $b^4$ are threaded through the upstanding front plate of the stand B, and these screws, one at each end, bear against the plate $b^1$ carrying the pillow-blocks. Expansion springs $b^5$, at the rear of the plate $b^1$, oppose the screws $b^4$. By turning the screws $b^4$, in either direction, the necessary accurate alignment of the shell may be attained. The plate $b^1$ is secured in adjusted position upon the stand B, by means of bolts $b^7$.

The electrode E is carried by a head D, sliding upon the upper free end of an oscillating lever C, pivoted at $c^1$ to the base $a^2$, of the table A. A crank F is secured at the front end of a shaft $f^1$, journaled in bearings upon the stand B. At its other end the shaft $f^1$, carries a fixed pinion $f^2$, which engages a rack $f^3$, pivoted at one end at $f^4$ to the oscillating lever C. A saddle $f^5$ rests upon the rack $f^4$, and embraces both the rack and pinion. The shaft $f^1$ is passed through the wings of the saddle, whereby accidental disengagement of the rack and pinion is prevented during the rotation of the latter. The pivotal point $f^4$ has a slight vertical movement while the lever C oscillates, and at such times the rack $f^3$, in sliding through the saddle $f^5$, will cause the latter to oscillate in a small degree about the shaft $f^1$.

As hereinbefore stated, the head D, slides upon the lever C. Such sliding movement is caused by a link $d^1$, connected at one end at $d^2$, to the said sliding head, and at the other at $d^3$, to one of the standards $a^3$. This link connection will be such that the sum of the combined vertical and lateral movements of the electrode E, carried by the head D, will be equal to the length of the welding line, and also to the length of the electrode consumed in the welding operation.

The head D is channeled at one side for the reception of the lever C, and a plate $d^{10}$, is secured to the head D, to close the channel and confine the head about the said lever.

At its other side the head D, is bored to receive the carrier for the electrode. At this point the head is slitted to the bore, as at $d^7$, to provide for the vertical adjustment of the electrode carrier, and so produce a gap which will be uniform when using electrodes of a given length. This carrier consists of a head or chuck $d^4$, depending from a shank $d^{20}$, guided by flanged fibrous insulating bushings $d^{21}$, fitted in a metallic sleeve $d^{30}$, the latter being inserted in the bore of the head and clamped therein in adjusted position by bolts, as shown. The head or chuck $d^4$ is bored axially for the reception of one end of the electrode, and provided with a thumb screw $d^9$, for retaining the electrode when inserted in the bore. At its upper end the shank $d^{20}$ is provided with a knob $d^5$, and at this point is attached the connection $d^{25}$, for transmitting current to the electrode. An expansion spring $d^6$, confined between the knob $d^5$, and the upper bushing $d^{21}$, serves to hold the electrode carrier in its most elevated position, with relation to the head D. The formation of the head $d^4$, upon the lower end of the shank $d^{20}$, provides a shoulder which contacts with the lower bushing $d^{21}$, and limits the upward movement of the parts under the influence of the spring $d^6$.

At points near the plane of the welding line, the lever C is bored to receive an adjustable guide $d^8$, for the free end of the electrode E. This guide may be adjusted laterally as well as vertically, by means of the devices shown in the drawings, and the eye at the free end of the guide, through which the electrode is passed, will preferably be provided with a vitreous or other insulating bushing to resist the high degree of heat generated at that point.

The housing or shield hereinbefore referred to, and indicated H, in the drawings, is composed of two sheets of metal, each bent to a right angle near one end. When assembled upon the table A, these sheets form the walls of a rectangular enclosure for the welding devices, each sheet constituting a side and an end of such enclosure. The sheet at the back and at one end is secured to the table. The other sheet is hinged at its end to the table, as at $h^2$, so as to be turned from its normal position as a part of the enclosure, and thus make the welding devices accessible to the operator, to insert and remove the work, replenish the electrodes, and make such adjustment as may be necessary.

In the front side or wall of the housing or shield, I have provided a peep-hole through which the operator may watch the progress of the welding operation, and to protect the eyes of the operator from injury by the powerful light generated in welding. I have arranged a screen of colored glass over such opening. This screen is placed in a hood $h^3$, hinged at $h^4$, to the front wall $h^1$, of the housing or shield, the hood registering with and sliding over a hollow projection $h^5$, fixed to the said front wall. The purpose of this hinged arrangement is to permit the quick adjustment of the screen to meet the requirements of operators of different stature.

A clamp $g^1$ is made to grip the shell G, which through the connection $g^2$, is brought in to the electrical circuit, the clamp being set upon the shell after the latter has been positioned for the welding operation. A reluctance coil will be arranged in the circuit. A single throw switch S, is attached to the table A, at a point for convenient manipulation by the operator. As indicated in Fig. 5 of the drawings, this switch will complete the electrical circuit, and by smartly tapping the knob $d^5$, the spring $d^6$ is compressed to impart an initial movement to the electrode E, and bring the point thereof into contact with the shell G, and thus by such initial movement and contact the arc is started. At this moment, the crank F is turned by the operator, and the electrode, which is now fusing is carried along the welding line in the regular progression hereinbefore referred to. By thus feeding the electrode as described, a given length thereof will be fused and evenly deposited over a corresponding length of the material to be welded, producing a joint which is uniform throughout as to its structure and maximum as to its strength. The transformer is indicated at T, Fig. 1.

The term "fusible electrode" in the claims, defines a metallic electrode which is fused or volatilized by the electric-arc, and which at the time of fusion is reduced or destroyed, with the result that the molten metal which flows therefrom is amalgamated in the fused union of the parts being welded.

The electrode may have movement with relation to the work, or the work may have movement with relation to the electrode. In carrying out the process embodying my invention, one of the parts mentioned is relatively stationary while the other part mentioned is movable past the stationary part, a feature of the invention residing in relatively moving the parts at a uniform rate of speed which bears a fixed ratio to the consumption of the electrode; consequently, either part may be the movable part. In the present application the work to be welded is stationary, and the electrode movable thereover. In the companion case referred to at the commencement of this specification, the work to be welded is moved past the point of a relatively stationary electrode.

What I claim and desire to secure by Letters Patent of the United States is:—

1. In an arc-welding apparatus, an electrical welding circuit, a holder for the work to be welded, a spring for retracting the electrode, an electrode carrier movable under compression of the spring to bring the electrode into contact with the work to strike an arc, and devices for feeding the fusible electrode along the welding line in the ratio of the consumption of the electrode.

2. An arc-welding apparatus having a fusible electrode, a holder for the work to be welded, an electrical welding circuit embracing the electrode and the work, a spring for retracting the electrode, an electrode carrier movable under compression of the spring to bring the electrode into contact with the work to strike an arc, and devices for feeding the fusible electrode along the welding line in the ratio of the consumption of the electrode.

3. An arc-welding apparatus having an electrical welding circuit of which a fusible electrode forms a part, a pivoted lever, an electrode carrier mounted to slide on the said lever, and connections to move the carrier during the movement of the lever to feed the fusible electrode in the ratio of the consumption of the latter.

4. An arc-welding apparatus having an electrical welding circuit of which a fusible electrode forms a part, a pivoted lever, an electrode carrier mounted to slide on the said lever, devices for imparting initial movement to the electrode to strike an arc between the electrode and the work to be welded, and connections to move the carrier during the movement of the lever to feed the fusible electrode in the ratio of the consumption of the latter.

5. An arc-welding apparatus having an electrical welding circuit of which a fusible electrode forms a part, a pivoted lever, an electrode carrier mounted to slide on the said lever, devices for imparting initial movement to the electrode to strike an arc between the electrode and the work to be welded, means for moving the pivoted lever, and connections to move the carrier during the movement of the lever to feed the fusible electrode in the ratio of the consumption of the latter.

6. An arc-welding apparatus having an electrical welding circuit of which a fusible electrode forms a part, devices for imparting an initial movement to the electrode by spring compression to strike an arc between the electrode and the work to be welded, an electrode carrier, a retracting spring therefor, and means for axially adjusting the said carrier with its fusible electrode.

7. An arc-welding apparatus having an electrical welding circuit of which a fusible electrode forms a part, an oscillating lever, an electrode carrier mounted to slide on the said lever, and means for axially adjusting the said carrier and its electrode with relation to the lever and the work to be welded.

8. An arc welding apparaus for welding work with a longitudinally curved surface, comprising a welding circuit including a fusible electrode for forming an arc with the said longitudinally curved surface, means for holding the work, means for feeding the electrode as the latter is fused, and means for moving the point of the electrode over the work, to enable the welding to be performed on the longitudinally curved surface.

9. The method of electric arc welding which consists in forming the work to be welded with a longitudinally curved welding line, arranging a current conducting fusible electrode with its point in proximity to such curved line, feeding the electrode as the point of the latter is fused, and moving the electrode over the work, to produce a welded joint along a line which is curved longitudinally with respect to the work.

In testimony whereof, I affix my signature this 27th day of November, 1918.

R. STANLEY SMITH.